United States Patent
Birkler et al.

(12)

(10) Patent No.: US 6,560,700 B1
(45) Date of Patent: May 6, 2003

(54) PROTOCOL FOR SYNCHRONIZING PARALLEL PROCESSORS IN A MOBILE COMMUNICATION SYSTEM

(75) Inventors: Jörgen Birkler, Bara (SE); Lars Novak, Bjärred (SE); Patrik Olsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/427,909

(22) Filed: Oct. 27, 1999

Related U.S. Application Data (60) Provisional application No. 60/108,902, filed on Nov. 17, 1998, and provisional application No. 60/110,485, filed on Dec. 1, 1998.

(51) Int. Cl.[7] .................................................. G06F 9/52
(52) U.S. Cl. ........................ 713/1; 713/400; 713/178; 707/201; 707/104.1
(58) Field of Search ................................ 713/400, 178, 713/1; 707/201, 104.1

(56) References Cited

U.S. PATENT DOCUMENTS

| | | | |
|---|---|---|---|
| 5,247,684 A | | 9/1993 | Tavares et al. ............. 395/700 |
| 5,307,487 A | | 4/1994 | Tavares et al. ............. 395/650 |
| 5,495,609 A | * | 2/1996 | Scott ........................... 395/600 |
| 6,006,274 A | * | 12/1999 | Hawkins et al. ............ 709/248 |
| 6,247,135 B1 | * | 6/2001 | Feague ......................... 713/400 |
| 6,330,568 B1 | * | 12/2001 | Boothby et al. ............. 707/201 |

FOREIGN PATENT DOCUMENTS

| WO | 99/02003 | 6/2000 |
|---|---|---|

OTHER PUBLICATIONS

IBM TDB vol.36, issue 11, p. 595–598, Pub. Date Nov. 1, 1993.*
IBM TDB vol.32, issue 12, p. 71–72, Pub. date May 1, 1990.*
*Bounding Journal Back–Off during Recovery of Data Base Replica in Fault–Tolerant Clusters*; IBM Technical Discloure Bulletin, vol. 36, No. 11, pp. 675–678; XP002138512.

* cited by examiner

Primary Examiner—Thomas Lee
Assistant Examiner—Nitin C. Patel
(74) Attorney, Agent, or Firm—Jenkens & Gilchrist, P.C.

(57) ABSTRACT

A method or protocol for synchronizing parallel processors in a mobile communication system is disclosed, whereby a sync engine associated with one processor retrieves the current value of a change counter for a database associated with the second processor, stores the current value of the change counter, retrieves all data entries from the database associated with the second processor, and performs a synchronization procedure for a database associated with the first processor based on of all of the data entries retrieved. By examining the change counter, the sync engine can determine whether a user modified a database while the synchronization was in process.

19 Claims, 4 Drawing Sheets

PROTOCOL FOR SYNCHRONIZING PARALLEL PROCESSORS IN A MOBILE COMMUNICATION SYSTEM

CROSS-REFERENCES TO RELATED APPLICATIONS

This Application for Patent claims the benefit of priority from, and hereby incorporates by reference the entire disclosures of, co-pending U.S. Provisional Applications for U.S. Pat. Ser. Nos. 60/108,902, filed Nov. 17, 1998, and U.S. Pat. Ser. No. 60/110,485, filed Dec. 1, 1998.

BACKGROUND OF THE INVENTION

1. Technical Field of the Invention

The present invention relates in general to the telecommunications field and, in particular, to a parallel processing synchronization protocol for use in a mobile communication system.

2. Description of Related Art

Figure 1:
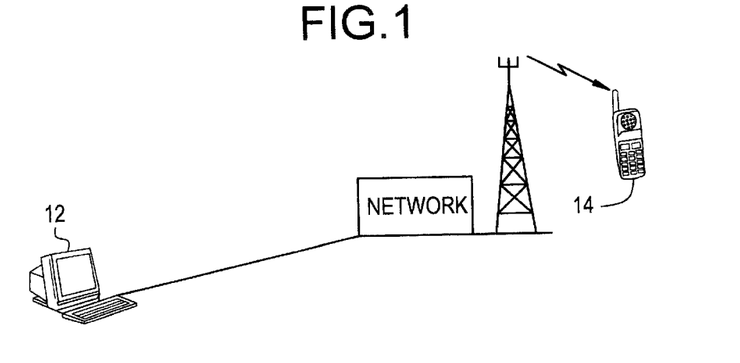
FIG. 1 block diagram of an existing parallel processor subsystem which can be used in a mobile telecommunications system.

FIG. 1 is a block diagram that illustrates how a plurality of parallel processors can be used, for example, in a mobile communication system. As shown, a complementary pair of digital processors located, for example, in a Personal Computer (PC) 12 and a mobile phone 14 can function or operate together in a parallel synchronous mode. The program and data software can be duplicated in each of the processors (12, 14), and the software instructions can be executed in parallel. The respective digital processors in the PC and mobile phone 12, 14 are connected to each other via a radio air interface.

Figure 2:
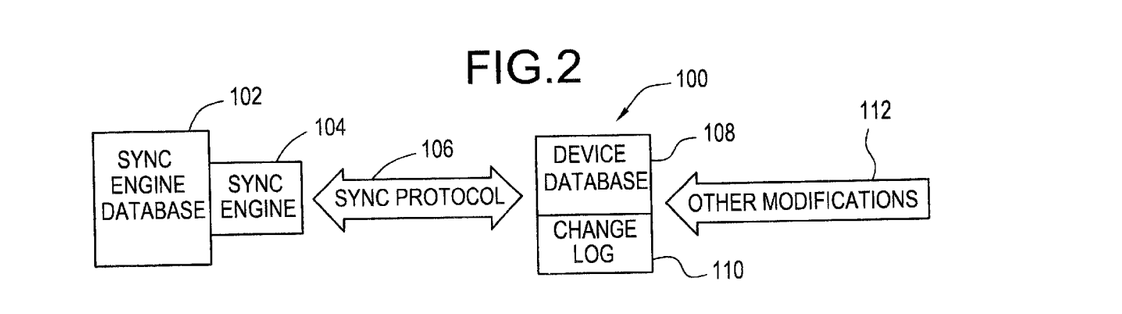
FIG. 2 is a block diagram of a synchronization apparatus that can be used for synchronizing parallel processors, such as the digital processors shown in FIG. 1.

FIG. 2 is a functional block diagram of a synchronization apparatus that can be used for synchronizing parallel processors, such as, for example, the digital processors illustrated by FIG. 1. Essentially, the synchronization process being described herein is preferably a method whereby two databases (e.g., a respective database associated with each processor in 12, 14) are processed to contain the same information. Ideally, changes made to entries in one database are also made to the other. In a broad context, such a database can include, for example, information from a phone book, a calendar, etc. As such, the contents of such a database can include any type of information typically associated with a parallel processing scheme.

Referring to FIG. 2, a synchronization (sync) engine 104 is connected to and associated with a particular (sync engine) database 102. For example, the sync engine database 102 can be a database associated with, or included as part of, the processor 12 shown in FIG. 1. In this context, a "sync engine" is preferably the software that performs the database synchronization functions. However, an apparatus that performs sync engine functions can also be considered as part of such a sync engine. A second (device) database 108 is to be synchronized with the sync engine database 102. For example, the device database can be associated with, or included as part of, the second processor 14. In this context, the device can be the digital processor 14 itself. Notably, a sync engine and database can be associated with each of the parallel processors to be synchronized. In other words, the parallel processor synchronization procedure can be performed in either direction. For example, the second processor 14 can also include a sync engine (104) and associated database (102), while the first processor 12 (e.g., a device) can also include a device database (108).

A synchronization protocol 106 is used to define the database synchronization method used. A change log 110 is associated with the device database 108. A change log is preferably a log or register in which changes destined for a database are temporarily stored. For example, the size of the change log 110 can be fixed, and older changes can be pushed out of the change log as new changes are added (first-in first-out or FIFO process). As such, each entry in the change log is associated with a certain event (e.g., add, delete or modify), a time stamp (e.g., a change counter value), and a Unique Identifier (UID). A UID is a number assigned to each new entry in a database (102 or 108). These numbers are unique in that they are not reused within the same database. A change counter (not explicitly shown) is a counter that is preferably increased for each change that occurs to a database. Preferably, the change counter value is stored in the change log for each change that occurs, and also stored in the sync engine 104 after synchronization has occurred.

If at least one of the two databases (e.g., 102 or 108) contains information when the first synchronization attempt is made, a "slow" synchronization procedure is performed. Slow synchronization is a procedure whereby all of the entries in one of the databases are compared with all of the entries in the other database involved. When such a slow synchronization procedure is performed, a UID resolution table is created (e.g., by the sync engine software). The entries in such a UID resolution table reflect the relationship between the entries in the two databases that have been synchronized. For example, if there is a UID for an entry in one database (e.g., 102), the UID resolution table provides information about what UID that same entry has in the second database (e.g., 108). On the other hand, a "fast" synchronization procedure is performed if the change log contains all database changes that have occurred since the last synchronization was performed. When such a fast synchronization procedure is performed, only those entries in the affected database have to be compared and transferred between the device database (108) and sync engine 104. Fast synchronization of databases is significantly faster than slow synchronization.

A significant problem that occurs with the existing protocol (e.g., as exemplified by block 106 in FIG. 2) followed for synchronizing parallel processors in certain telecommunication systems is that the protocol does not work if a database in one of the processors is modified (e.g., by a user's direct modification 112) while the processors are being synchronized. This problem occurs because the existing synchronization protocol requires the database being synchronized to be locked up so that only the sync engine can modify that database. Consequently, for those parallel processing schemes whereby the synchronization is being performed as a background application, for example, all user interaction with the processor (device) is frozen during the synchronization procedure. However, since that device's database is locked up during this period, only one of the device's synchronization engines can perform its synchronization functions at any one time.

Another significant problem with the existing protocol occurs when a device is reset and synchronized with a plurality of sync engines. For example, after a device has been reset, the first processor it is synchronized with will determine that the device has been reset and will restore all entries, because the change counter value is zero at that time. However, when a second processor is to be synchronized with the device, the second processor will not know that the device has been reset. Consequently, data can be lost or a slow synchronization procedure can occur as a result. Also, when restoring a database after a reset has occurred, the existing database will be overwritten by entries from the new database, which creates another problem if this action is not detected by the second processor. Nevertheless, as described in detail below, the present invention successfully resolves the above-described and other related problems.

SUMMARY OF THE INVENTION

In accordance with a preferred embodiment of the present invention, a method for synchronizing parallel processors is provided whereby a sync engine associated with one processor retrieves the current value of a change counter for a database associated with the second processor, stores the current value of the change counter, retrieves all data entries from the database associated with the second processor, and performs a synchronization procedure for a database associated with the first processor based on of all of the data entries retrieved.

An important technical advantage of the present invention is that a parallel processing synchronization protocol is provided whereby database entries can be modified while the database is being synchronized.

Another important technical advantage of the present invention is that a parallel processing synchronization protocol is provided whereby the synchronization duration is significantly decreased.

Another important technical advantage of the present invention is that a parallel processing synchronization protocol is provided whereby system traffic handling and throughput are significantly increased.

Still another important technical advantage of the present invention is that a parallel processing synchronization protocol is provided whereby resets and/or restores can be performed by a plurality of sync engines without any loss of data.

BRIEF DESCRIPTION OF THE DRAWINGS

A more complete understanding of the method and apparatus of the present invention may be had by reference to the following detailed description when taken in conjunction with the-accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with a preferred embodiment of the present invention, a parallel processor synchronization protocol and method are provided whereby a sync engine associated with one processor retrieves the current value of a change counter for a database associated with the second processor, stores the current value of the change counter, retrieves all data entries from the database associated with the second processor, and performs a synchronization procedure for a database associated with the first processor based on of all of the data entries retrieved.

Figure 3A:
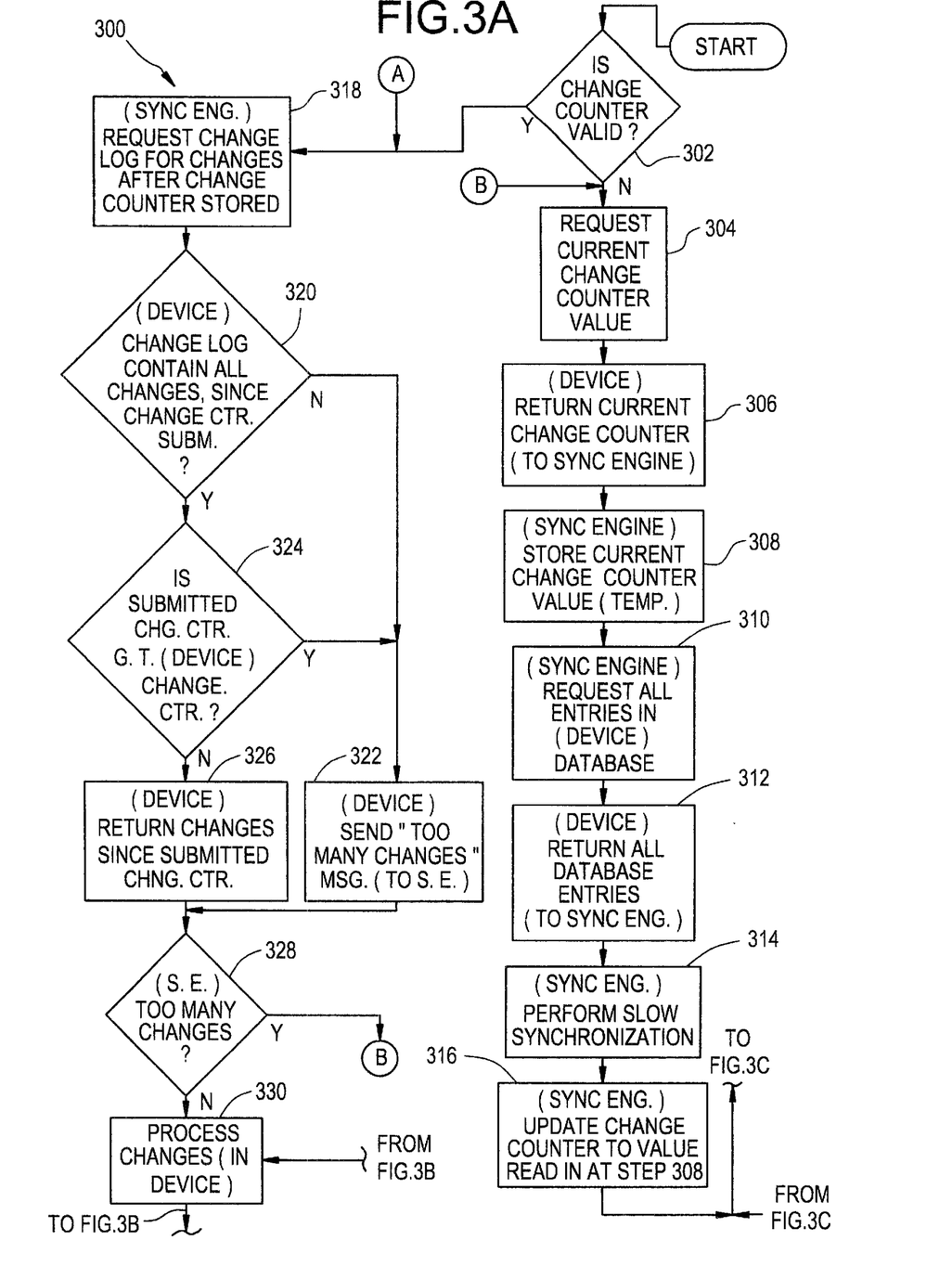
FIGS. 3A, 3B, and 3C illustrate a flow diagram of an exemplary protocol or method for synchronizing a plurality of processors in a telecommunication system, which can be implemented in accordance with a preferred embodiment of the present invention.
Figure 3B:
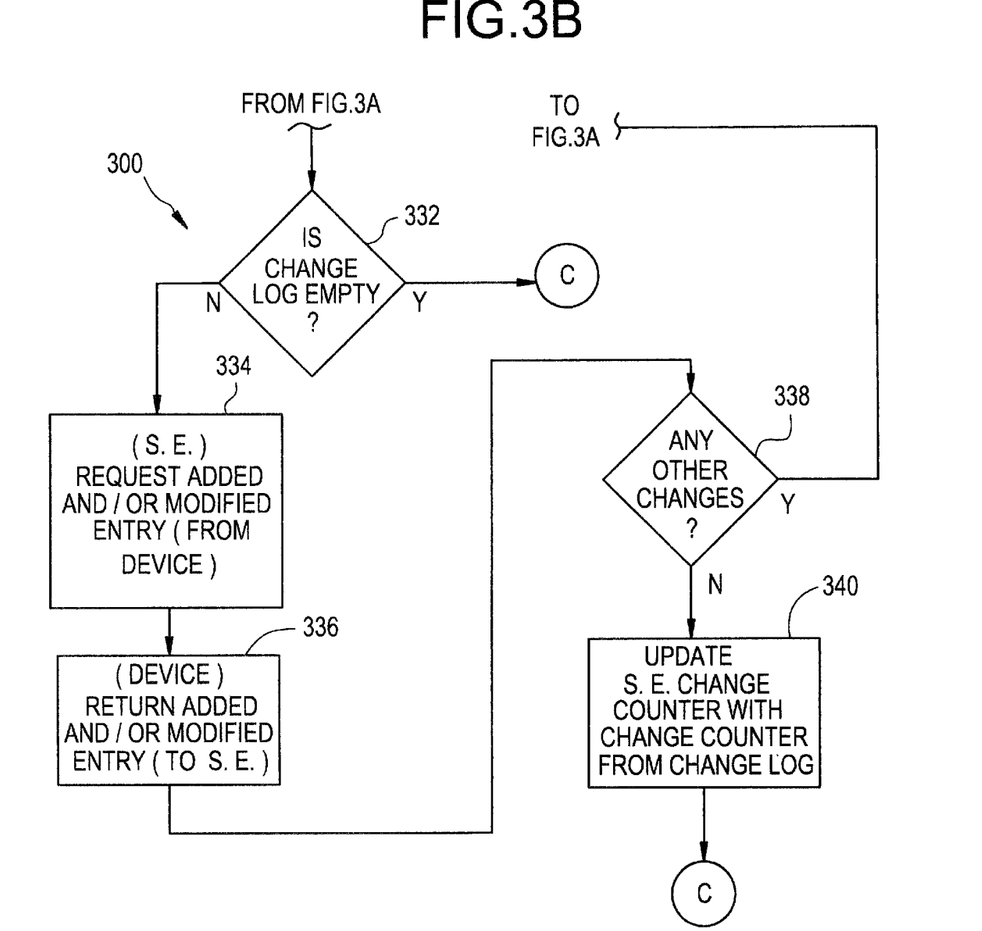
Figure 3C:
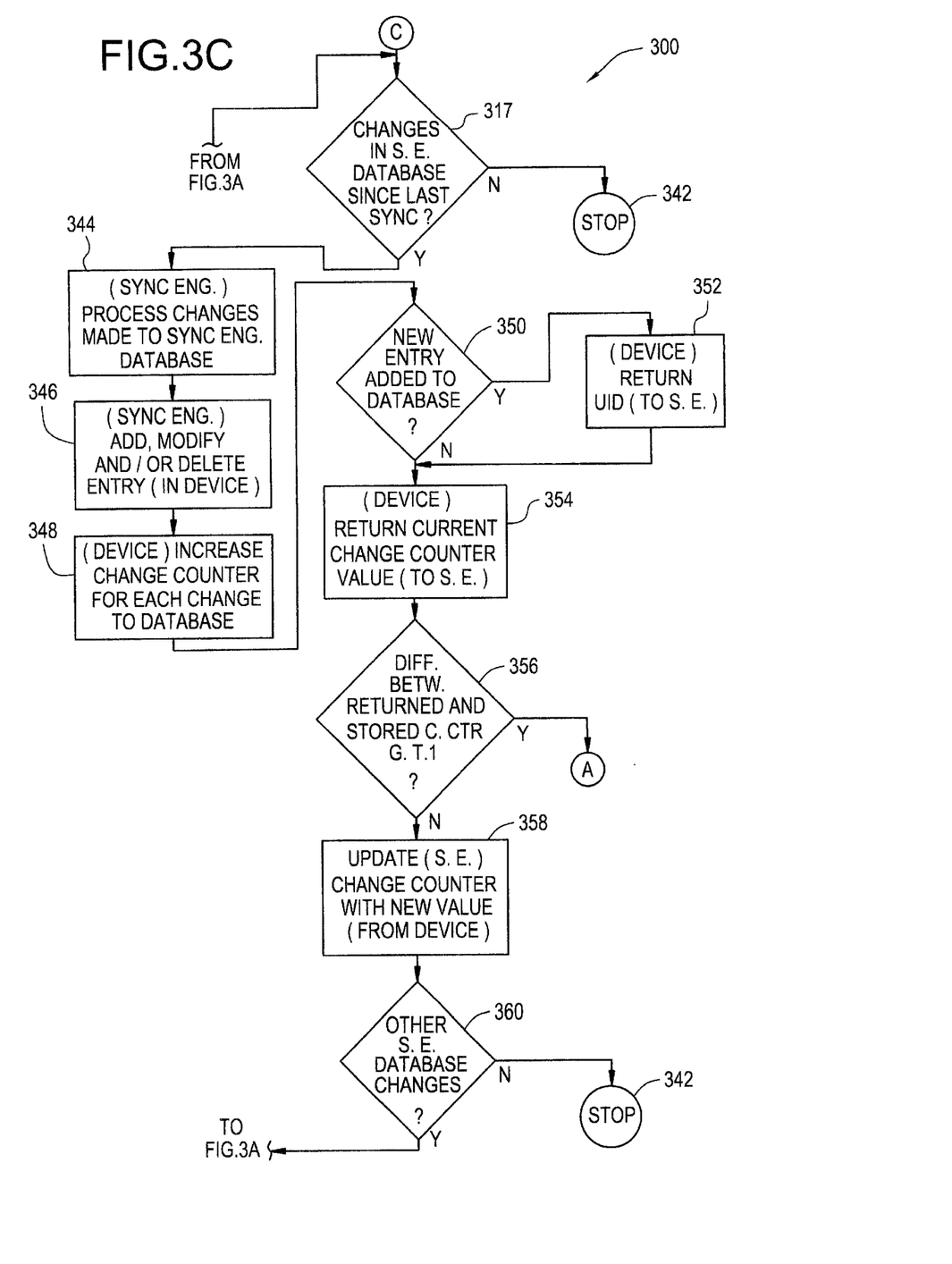

Specifically, FIGS. 3A, 3B, and 3C illustrate a flow diagram of an exemplary protocol or method 300 for synchronizing a plurality of processors in a telecommunication system, which can be implemented in accordance with a preferred embodiment of the present invention. For example, this protocol or method can be implemented by the synchronization apparatus and/or system shown in FIGS. 1 and 2 to synchronize the databases 102 and 108. Notably, as described earlier, the database synchronization can be performed in either direction (e.g., sync engine and database associated with either processor 12 or processor 14). At step 302 of the method (protocol), the sync engine (e.g., software associated with processor 12) determines whether a "valid" change counter has been stored. For example, a change counter may have been stored incorrectly if this step had occurred during the period when the databases were first being synchronized. If such a change counter has been incorrectly stored, at step 304, the sync engine 104 requests the current value of the change counter from the device (e.g., processor 14) associated with the second database to be synchronized (e.g., 108). In other words, the current value of the change counter is retrieved before the entire contents of the second database are read. In response, at step 306, the device returns the current value of the change counter to the sync engine. At step 308, the sync engine 104 stores (temporarily) the retrieved current value of the change counter. Notably, by retrieving the current value of the change counter before reading the entire contents of the device database (108), any entry changes made while the contents are being read can be detected when the databases are next synchronized.

At step 310, the sync engine 104 requests from the device (e.g., processor 14) all entries stored in the device database 108. At step 312, the device sends all of the existing entries stored in the device database 108 to the sync engine 104. At step 314, the sync engine 104 performs a slow synchronization procedure, whereby all entries in the device database 108 that have been added, modified and/or deleted (e.g., since the last synchronization) are respectively added, modified and/or deleted in the sync engine database 102. At step 316, the sync engine 104 updates the change counter with the retrieved change counter value stored (temporarily) at step 308.

Returning to step 302, if the value of the change counter is valid, at step 318, the sync engine 104 requests from the device (108) the change log 110 entries for all changes that occurred in the device database 108 after the last value of the change counter was stored. Notably, the size of the change log 110 can be minimized by reading only those changes that are of interest to the sync engine. This approach advantageously minimizes the transmission time from the device to the sync engine. At step 320, the device 108 determines whether or not all changes that occurred (if any) after the change counter was submitted (by the sync engine) are available in the change log 110. If so, at step 322, the device sends a "too many changes" message to the sync engine 104. Otherwise, returning to step 320, if the submitted change log does not contain any changes that occurred after the change counter was submitted, at step 324, the device determines whether the change counter value last submitted to the sync engine is greater than the value of the current change counter value at the device. In other words, a check is made to determine whether the change counter has wrapped around. If so, at step 322, the device sends a "too many changes" message to the sync engine. Notably, by having the device send a "too many changes" message to the sync engine if the change counter value submitted to the sync engine is greater than the device's current change counter value (device change counter has wrapped around), the potential problems related to the change counter's value wrapping around to zero can be avoided.

Returning to step 324, if the last submitted change counter value is not greater than the current change counter value at the device (108), at step 326, the device returns the change log changes with change counters greater than the submitted change counter. Preferably, for this embodiment, the entries in the returned change log are provided in chronological order with the oldest changes being provided first. Notably, by having the device return the oldest changes first, the sync engine can still process a portion of the change log even if the change log update has been interrupted.

At step 328, if the sync engine 104 determines that it has received a "too many changes" message from the device 108, the method proceeds to step 304. Otherwise, at step 330, the sync engine begins processing the entries in the change log returned from the device at step 326. The sync engine analyzes the received change log entries by starting with the oldest changes first. Consequently, the sync engine does not have to start the process over if the synchronization is interrupted for some reason. At step 332, if the sync engine determines that the change log is empty (no changes), the method proceeds to step 317. Otherwise, at step 334, the sync engine requests from the device each added and/or modified entry shown in the change log. At step 336, the device sends to the sync engine each such entry requested. Preferably, the oldest entries are requested first. At step 338, the sync engine determines whether there are more changes to be processed. If so, the method proceeds back to step 330 to continue processing changes. Otherwise, at step 340, the sync engine updates its change counter with the highest change counter received from the device's change log 110 (step 318).

At step 317, the sync engine 104 determines whether there have been any changes to the sync engine database 102 since the last database synchronization occurred. If no such changes have occurred since the last synchronization, the method is completed (step 342). Otherwise, if such changes have occurred since the last synchronization, at step 344, the sync engine begins processing the changes made to the sync engine database 102. At step 346, the sync engine adds, modifies and/or deletes the appropriate entries in the device database 108.

At step 348, the device increases its change counter by one unit for each change that occurs to an entry in the device database 108. At step 350, the device determines whether a new entry has been added to the device database 108. If so, at step 352, the device sends a UID for the new entry to the sync engine 104, and the method proceeds to step 354. Otherwise, if a new entry has not been added, at step 354 the device sends the current change counter value to the sync engine. Notably, by returning the current change counter value to the sync engine in response to a change or modification to the device database, the sync engine does not have to explicitly read the change counter value, which saves a substantial amount of processing time and avoids race problems that can occur between the sync engines involved.

At step 356, the sync engine determines whether there is a difference (i.e., since the test is to determine whether the difference is greater than 1) between the change counter value returned from the device (step 354) and the change counter value already stored at the sync engine? If so, the method proceeds to step 318. Notably, in accordance with the present invention, by examining the change counter at this point, the sync engine can determine whether someone else (e.g., user or other modification 112) has modified the device database 108. Otherwise, at step 356, if the sync engine determines there is no difference (e.g., greater than 1) between the change counter value returned from the device (step 354) and the change counter value already stored at the sync engine, at step 358, the sync engine updates the change counter value with the new value received from the device (step 354). Notably, by updating the change counter value after each change or modification to the device database, the sync engine does not have to restart the synchronization procedure if the present synchronization is interrupted for some reason. At step 360, if the sync engine determines there are more sync engine database changes to be made, then the method proceeds back to step 317. Otherwise, at step 342, the method is completed.

As described earlier, when a second processor is to be synchronized with a device, the second processor will not know that the device has been reset. Consequently, data may be lost or a slow synchronization procedure will occur as a result. Also, when restoring a database after a reset has occurred, the existing database will be overwritten by entries from the new database, which creates another problem if this action is not detected by the second processor. In accordance with the parallel synchronization protocol of the present invention, a second embodiment resolves the above-described problems by marking a newly-created database with a unique identifier (preferably associated with a randomly generated number). This "database ID" associated with a newly-created database is submitted by a device as an entry to all change logs. Consequently, by detecting this database ID in a device change log, a sync engine can determine when a database is newly created (or recreated). In other words, in accordance with the parallel synchronization protocol described above with respect to the preferred embodiment, when a change log is returned by a device to a particular sync engine, the database ID for a newly-created database is included in the change log. The sync engine compares this database ID with a previously-stored database ID (if any), and if the two database IDs do not match, the sync engine knows that the database has been re-created and a slow synchronization procedure should be performed.

As such, after a device is reset for any reason, the device is required to create a new database. During the process of creating such a new database, the device generates a new database ID (preferably a randomly generated number). However, if the entire database involved is overwritten (e.g., by a level-2 obex put), the device preferably follows the method described below with respect to the flow chart shown in FIG. 4 (as a complement to the parallel synchronization method or protocol described above with respect to FIGS. 3A, 3B, and 3C).

Figure 4:
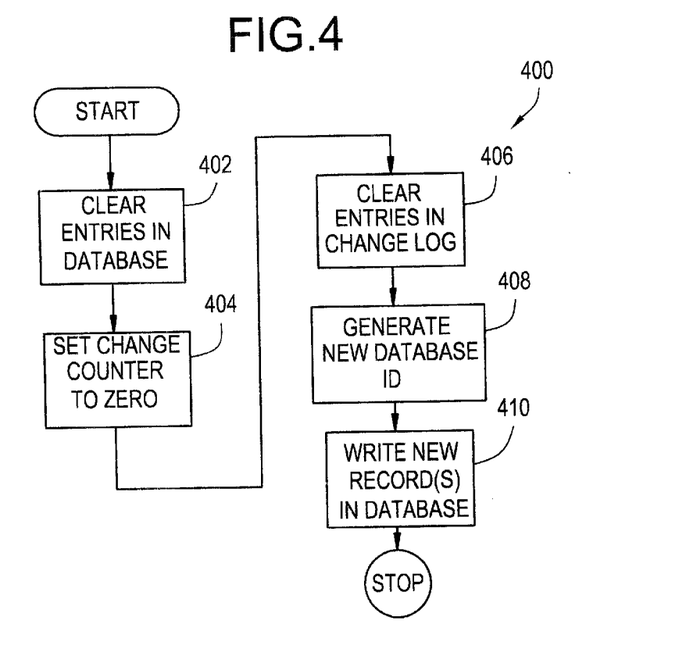
FIG. 4 is a flow diagram of an exemplary protocol or method for synchronizing a plurality of processors in a telecommunication system, which can be implemented in accordance with a second embodiment of the present invention.

FIG. 4 is a flow diagram of an exemplary protocol or method 400 for synchronizing a plurality of processors in a telecommunication system, which can be implemented in accordance with a second embodiment of the present invention. If a database (e.g., 108) has been completely overwritten, at step 402 in FIG. 4, the device clears the entries in that database. At step 404, the device sets the associated change counter value to zero. At step 406, the device clears the entries in the change log involved (e.g., 110). At step 408, the device generates a new database ID (preferably associated with a random number generated by the device). At step 410, the device writes the new records in the database involved (e.g., 108). In accordance with the is parallel synchronization protocol or method of the present invention, a new change log is created, and the change counter is updated.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for synchronizing processors in a telecommunication system, comprising the steps of:
   a first processor unit retrieving a current value of a change counter associated with a second processor unit, a first database associated with said first processor unit to be synchronized with a second database associated with said second processor unit;
   said first processor unit storing said current value of said change counter;
   said first processor unit retrieving a substantial portion of data stored in said second database;
   said first processor performing a synchronization procedure for said substantial portion of all data retrieved
   said second processor unit incrementing said change counter for a change of said data stored in said second database;
   said second processor unit determining whether new data has been stored in said second database;
   if said new data has been stored in said second database, sending a unique identifier associated with said new data to said first processor unit; and
   sending said current value of said change counter to said first processor unit.

2. The method of claim 1, wherein said first processor unit comprises a synchronization engine.

3. The method of claim 1, wherein said second processor unit comprises a synchronization engine.

4. The method of claim 1, wherein said processors comprise a plurality of parallel processors.

5. The method of claim 1, further comprising the steps of:
   said first processor unit receiving said current value of said change counter;
   said first processor unit determining whether there is a difference between said received current value of said change counter and a previous value of said change counter; and
   if there is said difference between said received current value of said change counter and said previous value of said change counter, said first processor unit retrieving a change log from said second processor unit;
   otherwise, if there is no said difference, said first processor unit updating said change counter with a new change counter value retrieved from said second processor unit.

6. The method of claim 5, further comprising the steps of:
   said first processor unit determining whether any of said new data in said second database has not been processed; and
   if said new data has been processed, said first processor unit updating said change counter with a value from said change log.

7. The method of claim 1, further comprising the steps of:
   clearing said data in said second database;
   setting said change counter to an initial value;
   clearing entries in a change log associated with said second database;
   generating an identifier associated with said second database; and
   storing new data in said second database.

8. The method of claim 1, further comprising the steps of:
   storing in said first database a first identifier associated with said first database;
   storing in said second database a second identifier associated with said second database;
   said first processor unit retrieving a change log from said second processor unit;
   said first processor determining whether said retrieved change log includes said second identifier; and
   if said retrieved change log does not include said second identifier, said first processor performing a slow synchronization procedure.

9. A system for synchronizing processors in a telecommunication system, comprising:
   a first processor unit;
   a first database associated with said first processor unit;
   a second processor unit;
   a second database associated with said second processor unit;
   means for interconnecting said first processor unit with said second processor unit;
   said first processor unit including means for retrieving a current value of a change counter associated with said second processor unit, storing said current value of said change counter, retrieving a substantial portion of data stored in said second database, and performing a synchronization procedure for said substantial portion of all data retrieved
   wherein said second processor unit is adapted to increment said change counter for a change of said data stored in said second database;
   wherein said second processor unit is adapted to determine whether new data has been stored in said second database;
   wherein, if said new data has been stored in said second database, a unique identifier associated with said new data is sent to said first processor unit; and
   wherein said current value of said change counter is sent to said first processor unit.

10. The system of claim 9, wherein said first processor unit comprises a synchronization engine.

11. The system of claim 9, wherein said second processor unit comprises a synchronization engine.

12. The system of claim 9, wherein said processors comprise a plurality of parallel processors.

13. A method for synchronizing processors in a telecommunication system, comprising the steps of:
   a first processor unit retrieving a current value of a change counter associated with a second processor unit, a first database associated with said first processor unit to be synchronized with a second database associated with said second processor unit;

said first processor unit storing said current value of said change counter;

said first processor unit retrieving a substantial portion of data stored in said second database; and said first processor performing a synchronization procedure for said substantial portion of all data retrieved;

clearing said data in said second database;

setting said change counter to an initial value;

clearing entries in a change log associated with said second database;

generating an identifier associated with said second database; and storing new data in said second database.

14. The method of claim 13, further comprising the steps of:

storing in said first database a first identifier associated with said first database;

storing in said second database a second identifier associated with said second database;

said first processor unit retrieving a change log from said second processor unit;

said first processor determining whether said retrieved change log includes said second identifier; and if said retrieved change log does not include said second identifier, said first processor performing a slow synchronization procedure.

15. The method of claim 13, further comprising the steps of:

said second processor unit incrementing said change counter for a change of said data stored in said second database;

said second processor unit determining whether new data has been stored in said second database;

if said new data has been stored in said second database, sending a unique identifier associated with said new data to said first processor unit; and sending said current value of said change counter to said first processor unit.

16. The method of claim 15, further comprising the steps of:

said first processor unit receiving said current value of said change counter;

said first processor unit determining whether there is a difference between said received current value of said change counter and a previous value of said change counter; and if there is said difference between said received current value of said change counter and said previous value of said change counter, said first processor unit retrieving a change log from said second processor unit;

otherwise, if there is no said difference, said first processor unit updating said change counter with a new change counter value retrieved from said second processor unit.

17. The method of claim 13, wherein said first processor unit comprises a synchronization engine.

18. The method of claim 13, wherein said second processor unit comprises a synchronization engine.

19. The method of claim 13, wherein said processors comprise a plurality of parallel processors.

* * * * *

UNITED STATES PATENT AND TRADEMARK OFFICE
CERTIFICATE OF CORRECTION

PATENT NO. : 6,560,700 B1
DATED : May 6, 2003
INVENTOR(S) : Jorgen Birkler et al.

It is certified that error appears in the above-identified patent and that said Letters Patent is hereby corrected as shown below:

Column 3,
Line 41, replace "the-accompanying" with -- the accompanying --
Line 42, replace "FIG. 1 block" with -- FIG. 1 is a block --

Column 7,
Lines 5-6, replace "with the is parallel" with -- with the parallel --

Signed and Sealed this

Ninth Day of September, 2003

JAMES E. ROGAN
*Director of the United States Patent and Trademark Office*